United States Patent [19]

Sasano et al.

[11] Patent Number: 4,468,567
[45] Date of Patent: Aug. 28, 1984

[54] LIQUID LEVEL DETECTING DEVICE AND METHOD FOR PRODUCING THE SAME

[75] Inventors: Naoshige Sasano; Nobuo Kowata, both of Sagamihara, Japan

[73] Assignee: Showa Electric Wire & Cable Co., Ltd., Kanagawa, Japan

[21] Appl. No.: 378,715

[22] Filed: May 17, 1982

[30] Foreign Application Priority Data

May 21, 1981 [JP] Japan .............................. 56-73780[U]
May 21, 1981 [JP] Japan .............................. 56-73781[U]

[51] Int. Cl.³ .............................................. G01F 23/22
[52] U.S. Cl. .................................. 250/577; 340/619; 350/96.15; 73/293
[58] Field of Search .......................... 73/293; 340/619; 350/96.15; 250/357.1, 577

[56] References Cited

U.S. PATENT DOCUMENTS

| | | | |
|---|---|---|---|
| 3,995,169 | 11/1976 | Oddon ............................... | 73/293 K |
| 4,155,013 | 5/1979 | Spiteri ................................ | 250/577 |
| 4,256,365 | 3/1981 | Lemesle et al. .............. | 350/96.15 X |
| 4,287,427 | 9/1981 | Scifres ................................ | 73/293 X |
| 4,289,398 | 9/1981 | Robichaud ................... | 350/96.15 X |

FOREIGN PATENT DOCUMENTS

2036326  6/1980  United Kingdom ................. 73/293

OTHER PUBLICATIONS

"Low-Loss Y-Coupler for Multimode Single Fibers", 12-1978, *Electronics Letters*, vol. 14, No. 25, pp. 808-809, Fiorina et al.

*Primary Examiner*—S. Clement Swisher
*Assistant Examiner*—Tom Noland
*Attorney, Agent, or Firm*—Finnegan, Henderson, Farabow, Garrett & Dunner

[57] ABSTRACT

A liquid level detecting device, which has a low transmission loss and may be miniaturized, comprising a plurality of optical fibers each composed of a core made of a transparent material and a cladding layer covering the core therewith and made of another transparent material having a lower refractive index than that of the former transparent material forming the core, end portions of the optical fibers being placed in adjacent to each other in either parallel arrangement or that attained by making an acute angle with each other, and a detecting portion which is obtained by heating the adjacent end portions of these optical fibers to fuse one another and shaping into a spherical form due to the surface tension of the fused material.

7 Claims, 22 Drawing Figures

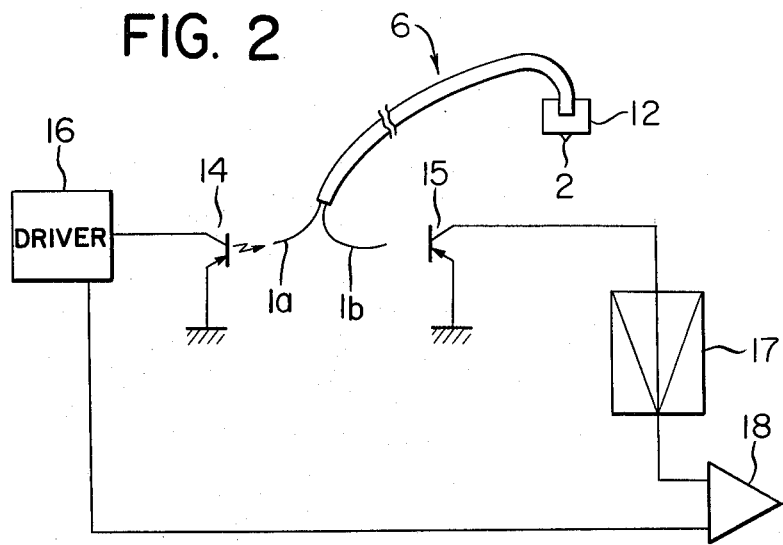
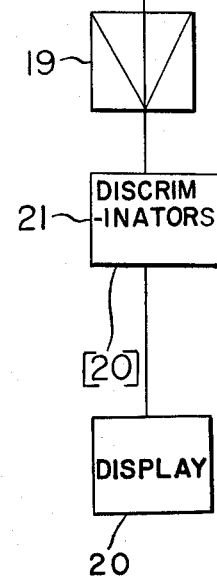
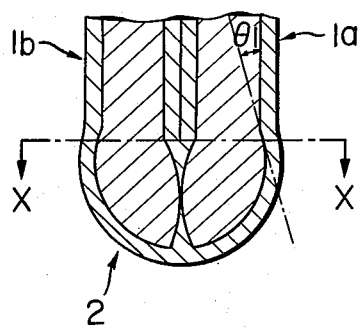
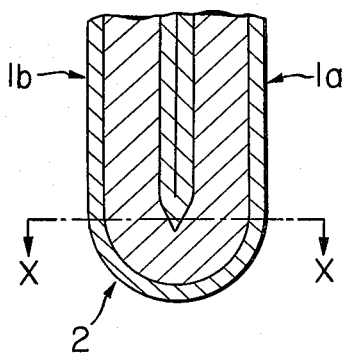

FIG. 13
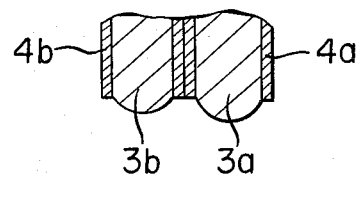
FIG. 14
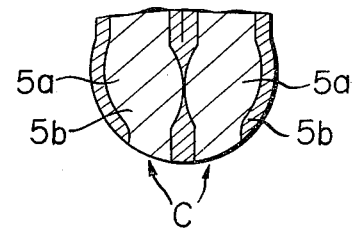
FIG. 15(a)   FIG. 15(b)   FIG. 15(c)
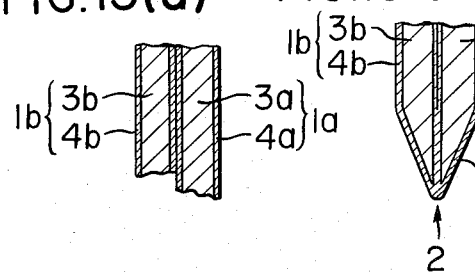
FIG. 16   FIG. 17   FIG. 18
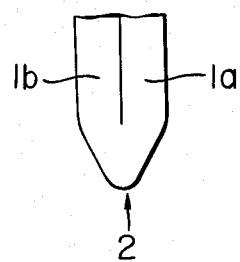 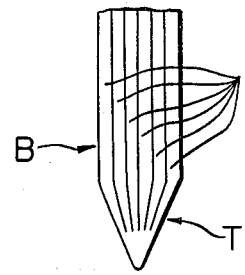 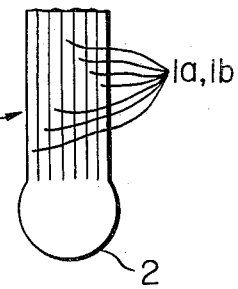
FIG. 19   FIG. 20
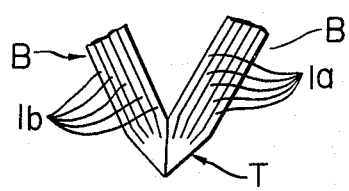 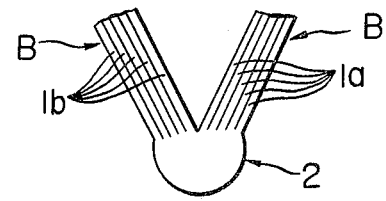

LIQUID LEVEL DETECTING DEVICE AND METHOD FOR PRODUCING THE SAME

BACKGROUND OF THE INVENTION

1. Field of the Invention

The present invention relates to a liquid level detecting device for optically detecting the liquid level in a tank or the like containing water, oil or the like therein and a method for producing the same.

2. Description of the Prior Arts

Heretofore, U-shaped glass sensors have been employed as a sensor for optically detecting a position of water level or oil level.

This sensor is prepared by bending the middle portion of a glass rod having a diameter of several mm. And the sensor is utilized in such a way that the U-shaped portion of the sensor is placed at a prescribed level in a liquid tank, light is propagated from one end of the glass rod, and the light thus propagated is received by the other end of the glass rod, whereby a difference of light transmission loss between the case where the U-shaped portion of the glass rod is in atmosphere and the case where the U-shaped portion is in a liquid is measured, so that it is determined whether the liquid level is above the position where the sensor is placed or not. Namely, in this glass rod, light behaves in response to refractive index of a material encompassing the glass rod, and light components each having a large angle of incidence in a curved portion project outside the glass rod, so that it results in increase of light transmission loss.

In such a type of sensor, since the light transmission loss thereof is very large, a detection sensitivity of the sensor is low, besides a length of the glass rod in its straight line part cannot be so prolonged, so that it requires such construction that a light source and a photoreceptive element are disposed very close to the U-shaped detecting part. As a result, there causes such difficulty that a detection signal cannot be transmitted to a control center if such detection signal has not at once been converted to an electrical signal in the vicinity of the detecting part. Furthermore, if an optical signal is intended to transmit to the control center, it is required to connect the glass rod to bundle fibers. In order to comply with such requirement, however, connectors are separately required for the glass rod and the bundle fibers, which involves the problem that the optical signal attenuates in such connecting portions.

In addition, since the light source and the photoreceptive element are fixedly disposed on a tank containing a material to be detected, there is such a disadvantage that maintenance and inspection of such device are troublesome.

In order to select an angle of incidence of the light to be fed to the glass rod so that the light transmission loss thereof becomes small, it is necessary to establish a bending radius of the glass rod with a high precision, and further a considerable strength is also required for maintaining the U-shaped form of the glass rod. Consequently, there is also such a disadvantage that miniaturization of such device is difficult.

Still further, there is also a disadvantage that when a size of the sensor becomes large and the sensor is positioned above the liquid level, a build-up in a material to be detected accrues on the sensor, so that an amount of leakage of light increases above the liquid level, and it brings about further lowering of detecting sensitivity.

On the one hand, relatively recently, an optical fiber, e.g., as disclosed in U.S. Pat. No. 4,083,625, consisting of a core made of a transparent material and a cladding layer covering the core therewith and made of another transparent material having a lower refractive index than that of the former transparent material forming the core has widely been utilized particularly in a field of information transmission as an optical guide having a very thin outer diameter, besides possessing a small transmission loss.

When such an optical fiber is bent in U-shaped form as in the case of the above-mentioned glass rod, the optical fiber can be utilized as a liquid level detecting device. In this case, however, the optical fiber is required to have a considerably long length as compared with the outer diameter thereof, so that the whole size of a device obtained from the optical fiber cannot be so miniaturized. Besides, since the optical fiber is very liable to be broken, there is a disadvantage that if the optical fiber has been bent into U-shaped form with a small curvature radius, it is easily broken.

U.S. Pat. No. 4,083,625 discloses an invention relating to an optical fiber junction device prepared by disposing a pair of optical fibers in side-by-side relationship, abutting an end face of another optical fiber upon end faces of the pair of optical fibers, and fusing the abutted portion together, thereby shaping a Y-shaped joined portion. However, it is to be noted that this joined portion relates to a mere Y-shaped branched, joined portion of optical fibers, but it does not function as a liquid level detecting device.

SUMMARY OF THE INVENTION

It is the first object of the present invention to provide a liquid level detecting device which has a very small transmission loss, i.e., a favourable sensitivity, by which a liquid level in a deep part of a tank can also be detected, and further through the use of which the light source and photoreceptive element can integrally be controlled.

The second object of the present invention is to provide a liquid level detecting device in which an optical detection signal can be transmitted to its control center without utilizing any connecting means.

The third object of the present invention is to provide a liquid level detecting device utilizing optical fibers by means of which the device can be miniaturized.

The fourth object of the present invention is a liquid level detecting device which is not easily broken, although optical fibers are utilized therein.

The fifth object of the present invention is to provide a liquid level detecting device in which dripping of the liquid attached to the optical fibers can be completed in a short period of time, in other words, response time thereof is short.

The sixth object of the present invention is to provide an improved process for producing a liquid level detecting device in which the optical fibers as mentioned above are used.

The foregoing and other objects and features of the present invention will be recognized and fully understood from the following detailed description of preferred forms and carrying out of the invention throughout which description reference is made to the accompanying drawings.

BRIEF DESCRIPTION OF THE DRAWINGS

FIG. 2 is a detection circuit diagram for the embodiment of FIG. 1.

FIGS. 4 through 6 are enlarged sectional views each showing another embodiment of the present invention.

FIGS. 13 and 14 are enlarged sectional views each showing a step for producing a liquid level detecting device in which a part of its spherical portion is covered with a cladding layer.

FIGS. 15(a), (b) and (c) are enlarged sectional views each illustrating a step for producing a liquid level detecting device in accordance with an improved method for the production of the device of the present invention.

FIG. 16 is a front view showing another embodiment of the liquid level detecting device produced in accordance with the above improved method.

FIGS. 17 and 18 as well as FIGS. 19 and 20 are enlarged front views each illustrating a situation in the production of a liquid level detecting device by utilizing a bundle fiber cable in accordance with the aforesaid improved method of the present invention.

DETAILED DESCRIPTION OF THE PREFERRED EMBODIMENTS

Figure 1:
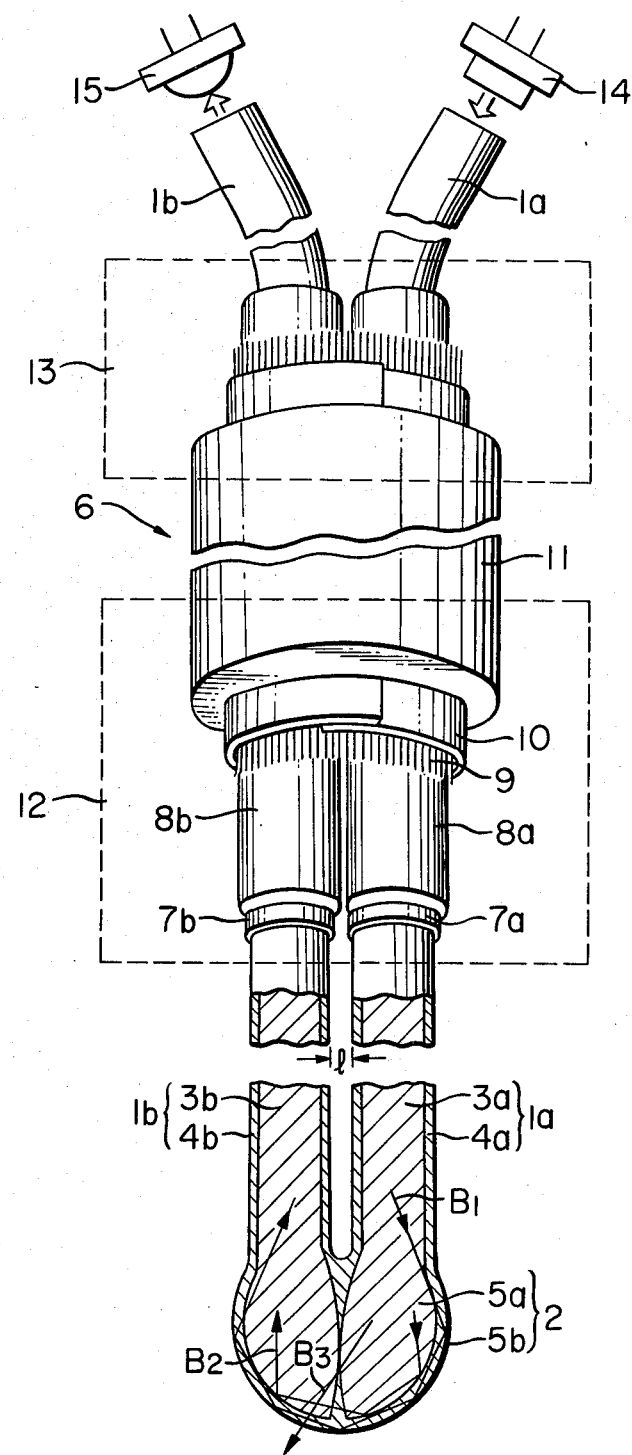
FIG. 1 is an enlarged view, partly in section, showing an embodiment according to the present invention.

Referring to FIG. 1 showing an embodiment of the liquid level detecting device according to the present invention which has a spherical portion 2 formed in a fused portion composed of a pair of optical fibers 1a and 1b and constructed by such manner that end portions of the pair of optical fibers 1a and 1b being arranged to be parallel to each other are heated to integrally fuse them thereby forming the spherical portion.

The optical fibers 1a and 1b are prepared from glass of a multiple component system or quartz glass and have each outer diameter of around several tens to several hundreds $\mu$. These optical fibers 1a and 1b consist of cores 3a and 3b being principal paths of light and cladding layers 4a and 4b covering the outer peripheries of the cores 3a and 3b respectively and being made of a material having a lower refractive index than that of the core forming material.

The optical fibers 1a and 1b thus composed have a very small damping factor which is sever tens dB/Km in case of multiple component system glass, but only several dB/Km in case of quartz glass.

The spherical portion 2 is formed at the time when the optical fibers 1a and 1b are heated to melt them in such a manner that the molten optical fibers 1a and 1b are welded together and they shrink into a spherical form by means of surface tension of the glass. Such spherical portion 2 consists of an inner spherical body 5a made of a core forming component and a cladding layer 5b covering the whole surface of the inner spherical body 5a and extending continuously to the cladding layers 4a and 4b.

The optical fibers 1a and 1b are the end portion of the core of an optical fiber cable 6 which is fabricated by such that buffer coats 7a and 7b made of silicone resin and reinforcement coverings 8a and 8b made of nylon are successively disposed on the outer peripheries of the optical fibers 1a and 1b, respectively, they are adjusted in paralleled twin-core arrangement, on the outer surface of which a reinforcement and cushion material 9 made of Kepler (Trade name of novolac type phenol resin fiber manufactured by E. I. Du Pont de Nemours & Co., Inc.) is disposed, on the outside of which a polyester woven fabric is arranged lengthwise, and a polyethylene sheath 11 is provided thereon as the outermost layer of the optical fiber cable.

A watertight bearing portion 12 is formed by means of an epoxy resin molding in such a condition where the optical fibers 1a and 1b as well as the spherical portion 2 are exposed by about 2 mm from the polyethylene sheath 11 to the optical fibers 1a and 1b.

On the other end portion of the optical fiber cable 6, a watertight bearing portion 13 is formed similarly to the bearing portion 12 on the spherical portion 2 side by means of the epoxy resin molding in a condition where the optical fibers 1a and 1b are exposed from the polyethylene sheath 11 to them. Furthermore a light emission diode 14 and a pin diode 15 are disposed adjacent to the end surfaces of cores 1a and 1b of the optical fiber cable, respectively.

The liquid level detecting device as constructed above is utilized as described hereinbelow.

First, the bearing portion 12 is secured to a suitable bearing member so as to position the spherical portion 2 of the liquid level detecting device to a detection level of a tank or the like. In this case if such liquid level detection is intended to be effective in several points along the direction of height of the tank or the like, a required number of such liquid level detecting devices corresponding to the number of levels to be detected are prepared.

Then, as shown in FIG. 2, the light emission diode 14 is energized from a driver 16 for the light emission diode 14 to light up the same, whereby light is fed into the optical fiber 1a through the end face thereof.

The light fed through the end face of the optical fiber 1a is propagated into the spherical portion 2 by way of the following three routes.

First, as indicated by an arrow $B_1$ in FIG. 1, there is a route that the light passed through the optical fiber 1a penetrates into the cladding layer 5b in the spherical portion 2 corresponding to a sensor head, the light thus penetrated repeats reflection at the surface of the spherical portion 2, and then the light enters into the core 3b of the optical fiber 1b.

Second, as indicated by an arrow $B_2$ in FIG. 1, there is another route where the light passed through the core 3a of the optical fiber 1a repeats total reflection at the boundary between the inner spherical body 5a and the cladding layer 5b in the spherical portion 2, and the the light enters into the core 3b of the optical fiber 1b as it stands.

Finally, as indicated by an arrow $B_3$ in FIG. 1, there is still another route where the light propagated through the core 3a of the optical fiber 1a leaks from the spherical portion 2 to the outside thereof as it is.

In the circumstances, the light taking the route indicated by the arrow $B_2$ is a light power which returns to the output side irrespective of the outside condition, whereas the light through the route indicated by the arrow $B_1$ determines a sensitivity (amount of light loss) of the sensor.

The light thus propagated through the optical fiber $1b$ is discharged from the end face thereof, and is received by the pin diode 15 to generate an electrical signal. The electrical signal generated from the pin diode 15 is amplified by an amplifier 17, as shown in FIG. 2, the amplified electrical signal is inputted into a comparator 18 together with a reference voltage for comparison generated from the driver 16 for the light emission diode, and the differential voltage is generated from the comparator 18.

In such condition, the light passing through the route indicated by the arrow $B_1$ and the light passing through the route indicated by the arrow $B_2$ in the light transmitted into the optical fiber $1a$ are received by the pin diode 15, respectively, in case that the spherical portion 2 is above the liquid level. On the other hand, if the spherical portion 2 is below the liquid level, the light passing through the route $B_1$ is substantially discharged into the liquid and only the light passing through the route $B_2$ is received by the pin diode 15. Accordingly, if the amplifier 17 has previously been adjusted so that output of the comparator 18 comes to be zero in case that the spherical portion 2 is above the liquid level, differential voltage is generated from the comparator 18 only when the spherical portion 2 becomes below the liquid level.

In this connection, if it is arranged that the output from the comparator 18 is amplified by means of the amplifier 19 so as to light up, for example, a display light emission diode 20, liquid level detection can be effected. However, as a matter of fact, even if the spherical portion 2 is above the liquid level, there is a possibility that light is attenuated by a slight amount of the liquid attached to the spherical portion 2, and such differential voltage based on the attenuated light is fed from the comparator 18. For this reason, it is practically arranged that the differential voltage as mentioned above is caused to pass through a discriminator 21 so that the display light emission diode 20 is lighted up in only the case where output of a predetermined value or more is fed from the discriminator 21.

Figure 3:
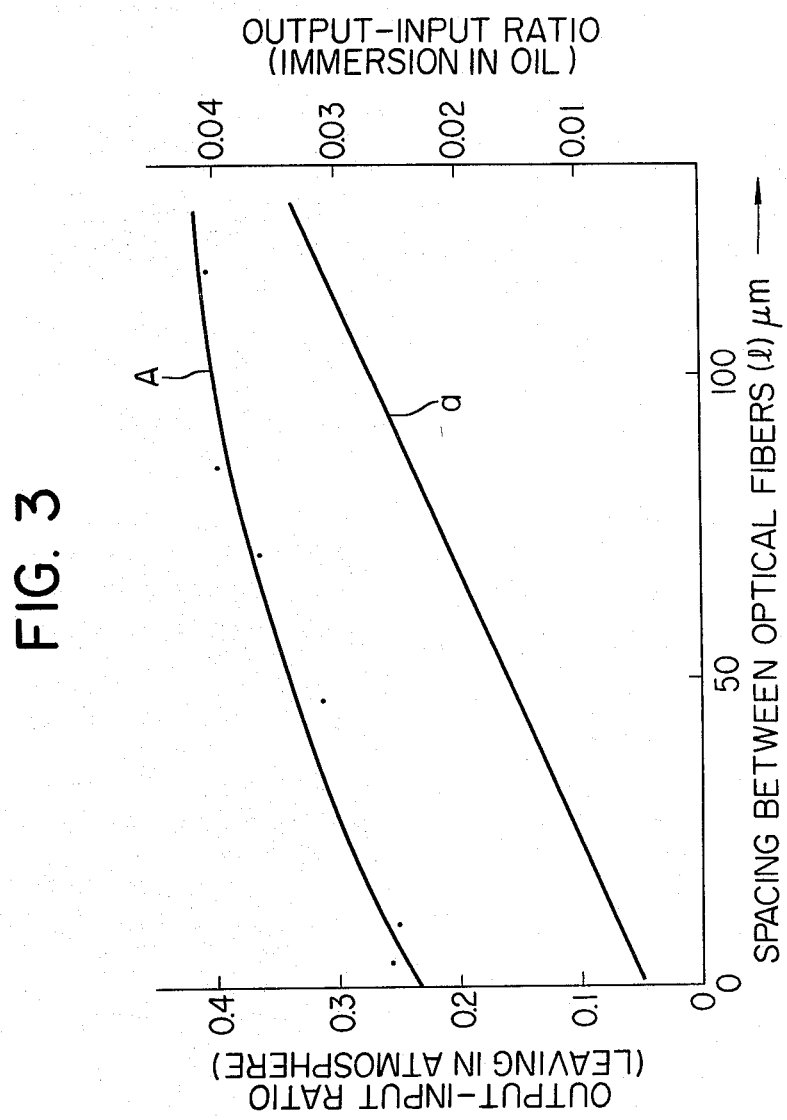
FIG. 3 is a graphical representation illustrating a relationship between an input-output ratio of a spherical portion of the liquid level detecting device of this invention in either the case where the spherical portion is left in atmosphere, or the case where the spherical portion is immersed in oil and a spacing defined between a pair of optical fibers.

In order to determine a relationship between sensitivity and a spacing which is formed between the optical fibers $1a$ and $1b$, two each optical fibers each prepared from multiple component system glass and having $100\mu$ core diameter and $20\mu$ cladding thickness ($140\mu$ diameter) are selected. A spacing (shown as "l" in FIG. 1) between each two optical fibers thus selected is arranged substantially in parallel to each other by variously changing the same, end portions of the optical fibers are heated to fuse one another, thereby forming the spherical portion 2 as shown in FIG. 1, and finally a liquid level detecting device is fabricated. Each output-input (O/I) ratio of the spherical portions 2 of liquid level detecting devices having various spacings is measured in respect of the case where the respective spherical portions are left in atmosphere and the case where the spherical portions are immersed in oil having a refractive index of 1.487. The measured results are as illustrated in FIG. 3. From these results, it is understood that the narrower spacing between optical fibers brings about the higher input-output ratio in atmosphere as well as oil, so that liquid level detection can be effected with a favourable precision. For this reason, it is desirable that such spacing between optical fibers is made to be narrower than the diameter of the optical fiber.

FIG. 4 shows an example of the present invention in which two optical fibers $1a$ and $1b$ are intimately arranged, and a spherical portion 2 is formed at the extreme ends of the optical fibers.

It is to be noted that referring now to FIG. 4 onward the corresponding parts to those of FIG. 1 are designated by the same reference numerals as those of FIG. 1.

In the example shown in FIG. 4, the optical fibers $1a$ and $1b$ and intimately arranged in parallel to each other in such that a spacing l therebetween in FIG. 1 becomes zero, and in this condition, the extreme ends of the optical fibers are fused one another. Then, the spherical portion 2 is formed with such a curvature that a tangential line at the upper end of the spherical portion 2 comes to be parallel to a maximum angle in divergent light which projects in the case where the optical fibers $1a$ and $1b$ are cut off by means of a perpendicular plane to the axes of the optical fibers $1a$ and $1b$ along the line X—X extending through the upper end of the spherical portion 2, that is, an angle of projection $\theta_1$. Further, in the example shown in FIG. 5, it is constructed that projection beam being parallel to the axes of optical fibers comes to be parallel with the tangential line along the line X—X extending through the upper end of a spherical portion 2.

In the boundary between the aforesaid spherical portion 2 and the optical fiber $1a$, light derived from the side of the optical fiber $1a$ passes through three types of the routes as mentioned above. Among these routes, the much more light corresponding to that indicated by the arrow $B_1$ in FIG. 1 results in the more favourable sensitivity in detection, whereas the much more light corresponding to that indicated by the arrow $B_3$ brings about the much more increase of loss.

Thus, it is preferable that a curvature radius of the spherical portion is within a range which has a smaller value than that of FIG. 4 and also has a larger value than that of FIG. 5.

According to experiments, if a curvature radius in the spherical portion is smaller than that of a diameter of the optical fiber, its sensitivity becomes favourable, but its loss comes to be remarkable. On the one hand, if a curvature radius in the spherical portion is larger than that shown in FIG. 4, its sensitivity becomes less and its loss comes to be lower than that of the example shown in FIG. 4.

Figure 6:
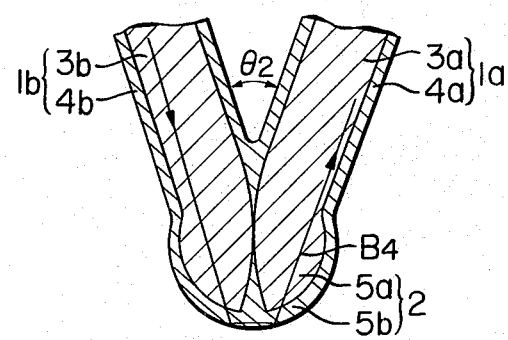

In the example shown in FIG. 6, two optical fibers $1a$ and $1b$ are abutted against each other at their extreme ends with an included angle of an acute angle $\theta_2$. In this arrangement, it is constructed in such that incident light (indicated by an arrow $B_4$) fed through the inside of a core $5a$ of the optical fiber $1a$ in parallel to the axis thereof strikes upon a cladding layer $5b$ just in its spherical portion 2.

Figure 7:
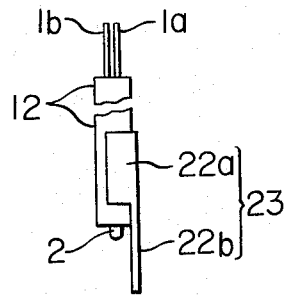
FIGS. 7 and 8 are a side and a front view showing another embodiment of the present invention.
Figure 8:
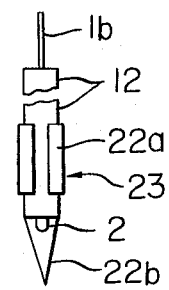

The example shown in FIGS. 7 and 8 possesses a dripping member 23 consisting of a holding portion $22a$ fixed to the bearing member 12 formed by means of epoxy resin and a convergent liquid guide piece $22b$ extending from the holding portion $22a$ over its spherical portion 2. In the device according to this example, the liquid attached to the spherical portion 2 drops through the liquid guide piece $22b$, so that there is not such a case where large droplets build up on the spherical portion 2. As a consequence, response time can be shortened even in a case where a level of liquid having a relatively high viscosity is detected. In addition, since the liquid guide piece 22b in the dripping member 23 extends over the spherical portion 2, the dripping member 23 is effective for the spherical portion 2 as its protector.

Figure 9:
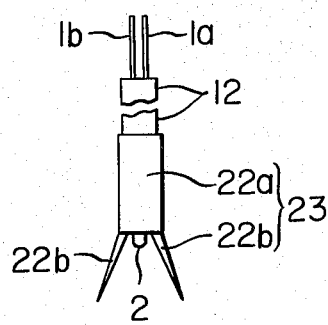
FIGS. 9 and 10 are a front and a front view showing still another embodiment of the invention.
Figure 10:
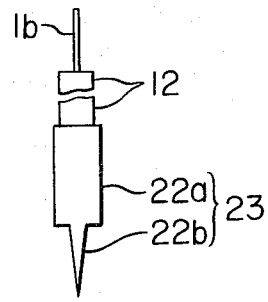
Figure 11:
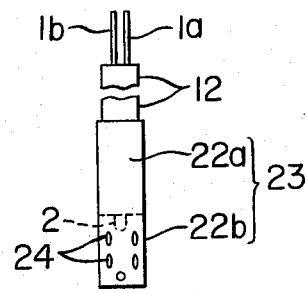
FIGS. 11 and 12 are front views each showing a further embodiment of the present invention.
Figure 12:
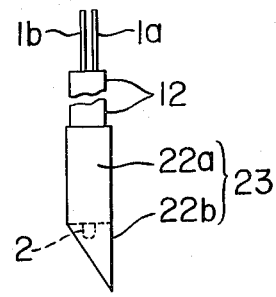

In the example shown in FIGS. 9 and 10, a spherical portion 2 is sandwiched in between two liquid guide pieces 22b. In the example shown in FIG. 11, a liquid guide piece 22b is composed of a cylindrical piece on which a number of through-holes 24 are bored. In the example shown in FIG. 12, a liquid guide piece 22b is composed of a cylindrical piece being diagonally cut.

In these examples, the dripping members 23 may be formed by metals, plastics or any other materials which do not dissolve or swell in a liquid to be detected.

The liquid level detecting device according to the present invention is generally produced by a method to be described hereinbelow.

Namely, first, end faces of a plurality of optical fibers are shaped into a planar form, which is substantially perpendicular to the central axes of the optical fibers, by means of cutting or heat treatment. Then, the extreme ends of the optical fibers are arranged properly, and the extreme ends thus arranged are heated to fuse one another.

Next, the fused end portions are further heated to lower the viscosity in the fused portion, and as a result a spherical portion is formed at the end portions thereof by means of surface tension of the molten glass.

Meanwhile, in the method as mentioned above, a treatment for end faces of optical fibers is troublesome, so that it is very difficult to apply the method to a bundle fiber cable consisting of a number of optical fibers. Besides, since the core of an optical fiber has usually a lower melting point than that of the cladding layer thereof, the core 1a melts at first and swells in the initial stage of heating as shown in FIG. 13, then the cladding layer 1b succeedingly melts, and fusion of the optical fibers is effected. For this reason, a spherical portion 2 happens to have a portion c which fails to form the cladding layer 1b as shown is FIG. 14. Thus, there arise such disadvantages in lowering of sensitivity in a detection, formation of irregular parts in end faces of optical fibers in case of heating and fusing the same, and increase in transmission loss due to generation of air bubbles in the spherical portion 2 derived from trapped air in spacings between the optical fibers 1a and 1b.

Such troubles can be eliminated, if a spherical portion is formed in accordance with the following manner.

Namely, as shown in FIGS. 15(a)–(c), end portions of a plurality of optical fibers 1a and 1b are arranged in the same direction (FIG. 15(a)), the end portions are heated to fuse one another, and then the resulting fused portion is rapidly pulled to cut off in the direction parallel with the axes of the optical fibers by picking up the fused portion with a pincette or the like while such fused portion remains softened. By means of such manner as described above, a convergent taper portion T of which the whole extreme end is covered with cladding layers 4a and 4b is formed (FIG. 15(b)).

Thereafter, when the resulting taper portion T is again heated to melt the same, a spherical portion 2 the whole surface of which is covered with a cladding layer 5b is easily obtained.

The spherical portion 2 formed in accordance with the manner as described above has the taper portion T the surface of which is flattened in the condition shown in FIG. 15(b) and also possesses the optical fibers 1a and 1b with no spacing, since they have been completely fused one another. Accordingly, even if such spherical portion 2 is heated to melt, there causes no inclusion of air bubbles in the spherical portion 2.

Moreover, according to this manner, a liquid level detecting device may be obtained by forming a spherical portion 2 on the extreme end portion of a taper portion T as shown in FIG. 16.

Besides this manner does not require a treatment for flattening the faces of optical fibers, so that bundle fibers B are fused one another as shown in FIG. 17 and at the same time, a taper portion T is formed, and then the resulting taper portion T may be heated to form a spherical portion 2.

In addition, as shown in FIG. 19, two pairs of bundle fibers B on each extreme end of which a taper portion T is formed are prepared, they are contacted with each other in their taper portions T, and then these portions may be heated to fuse one another to form a spherical portion 2 as shown in FIG. 20.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

What is claimed is:

1. A liquid level detecting device comprising:
(a) a plurality of optical fibers, their end portions arranged in close vicinity to one another, each having a core made of a transparent material and a cladding layer covering said core therewith and made of another transparent material having a lower refractive index than that of the former transparent material forming said core; and
(b) a detecting portion composed of an inner substantially spherical body formed by heating mutually adjacent end portions of said optical fibers to fuse with one another and made of the same material as that of the transparent material forming said core, said inner spherical body being in one body with said cores; and a cladding layer covering said inner spherical body made of the same material as that of the transparent material forming said cladding layers of said optical fibers and forming a continuous layer with each cladding layer of said optical fibers.

2. A liquid level detecting device in accordance with claim 1 wherein a plurality of said optical fibers are arranged in parallel to each other.

3. A liquid level detecting device in accordance with claim 2 wherein said optical fibers are arranged in parallel with a space there between more narrow than the outer diameter of either optical fiber.

4. A liquid level detecting device in accordance with claim 1, wherein the optical fibers near said detecting portion are provided with a bearing portion having a dripping member mounted thereon, the dripping member including a guide piece extending over said detecting portion.

5. A liquid level detecting device comprising:
(a) a plurality of optical fibers, their end portions arranged in close vicinity to one another, each consisting of a core made of a transparent material and a cladding layer covering said core therewith and made of another transparent material having a lower refractive index than that of the former transparent material forming said core;
(b) a detecting portion composed of an inner spherical body formed by heating mutually adjacent end portions of said optical fibers to fuse with one another and made of the same material as that of the transparent material forming said core, said inner spherical body being in one body with said cores, and a cladding layer covering said inner spherical body made of the same material as that of the transparent material forming said cladding layer of the optical fibers and forming a continuous layer with each cladding layer of said optical fibers;
(c) a bearing portion formed by a resin molding on the outer periphery of the optical fibers near said detecting portion; and
(d) a dripping member fixed to said bearing portion and having a guide piece which extends over said detecting portion.

6. A liquid level detecting device in accordance with claim 5 wherein the resin utilized for said resin molding is a member selected from the group consisting of thermosetting resins.

7. A liquid level detecting device comprising:
(a) a first and second optical fiber, their end portions arranged in close vicinity one to another, each said fiber consisting of a core made of a transparent material and a cladding layer covering said core therewith and made of another transparent material having a lower refractive index than that of the former transparent material forming said cores;
(b) a detecting portion consisting of an inner body formed by heating mutually adjacent end portions of said optical fibers to fuse with one another and made of the same material as that of the transparent material forming said cores, said inner spherical body being in one body with said cores, and a cladding layer covering said inner spherical body made of the same material as that of the transparent material forming said cladding layer of said optical fibers and forming continuous layer with each cladding layer of said optical fibers;
(c) a bearing portion formed by a resin molding on the outer periphery of the optical fibers near said detecting portion;
(d) a dripping member fixed to said bearing portion and having a guide piece which extends over said detecting portion;
(e) a light source optically connected to the first optical fiber on the end opposite the detecting portion; and
(f) a photo detector optically connected to the second optical fiber on the end opposite the detecting portion.

* * * * *